(12) United States Patent
Fuetterer et al.

(10) Patent No.: US 8,841,926 B2
(45) Date of Patent: Sep. 23, 2014

(54) METHOD, LIQUID SUPPLY UNIT, AND MEASUREMENT DEVICE FOR A LEVEL INDICATOR

(75) Inventors: Harald Fuetterer, Donaueschingen (DE); Dieter Stellmach, Bad Duerrheim (DE)

(73) Assignee: Phoenix Contact GmbH & Co. KG (DE)

( * ) Notice: Subject to any disclaimer, the term of this patent is extended or adjusted under 35 U.S.C. 154(b) by 457 days.

(21) Appl. No.: 12/161,500

(22) PCT Filed: Jan. 11, 2007

(86) PCT No.: PCT/EP2007/000205
§ 371 (c)(1),
(2), (4) Date: Jul. 18, 2008

(87) PCT Pub. No.: WO2007/087971
PCT Pub. Date: Aug. 9, 2007

(65) Prior Publication Data
US 2010/0295562 A1 Nov. 25, 2010

(30) Foreign Application Priority Data
Jan. 20, 2006 (DE) .......................... 10 2006 003 054

(51) Int. Cl.
*G01R 27/26* (2006.01)
*G01F 23/26* (2006.01)
*B41J 2/175* (2006.01)

(52) U.S. Cl.
CPC ............. *G01F 23/26* (2013.01); *B41J 2/17513* (2013.01); *B41J 2/17509* (2013.01); *B41J 2/17566* (2013.01)
USPC .......... 324/671; 73/304 C; 73/290 R; 347/57; 347/85; 347/92; 417/413.3

(58) Field of Classification Search
USPC ......................................................... 324/671
See application file for complete search history.

(56) References Cited

U.S. PATENT DOCUMENTS 4,261,397 A * 4/1981 Guy .................................. 141/1
4,432,005 A 2/1984 Duffield et al.
(Continued)

FOREIGN PATENT DOCUMENTS

DE 4440561 A1 5/1996
DE 199 35 673 A1 4/2001
(Continued)

OTHER PUBLICATIONS

Tanabe, Eiji, "JP Application No. 2008-550667 Office Action May 23, 2011"Publisher: JPO, Published in: JP.
(Continued)

*Primary Examiner* — Benjamin M Baldridge
(74) *Attorney, Agent, or Firm* — Kaplan Breyer Schwarz & Ottesen, LLP (57) ABSTRACT

The subject matter of the invention is a method for a printing machine with a printing device (5), in particular an inkjet printer, for applying liquid (22) onto a print material, with monitoring of the quantity of liquid in a liquid supply unit (1) by measuring the liquid level (23) with a sequential controller, wherein the measurement of the liquid level (23) is performed by a device (11), which detects the presence of liquid at the output of the printing device (5).
Another subject matter of the invention is a liquid supply unit (1) for a printing machine with a printing device (5), in particular, an inkjet printer, for applying liquid (22) on a print material, with monitoring of the quantity of liquid in a liquid supply unit (1) by measuring the liquid level (23) with a sequential controller, wherein the measurement device (11) is suitable for measuring a fill level (23) and for controlling a liquid device (3).
Furthermore, a measurement device (11), in particular, for a liquid supply unit (1), is the subject matter of the invention, in which at least one part of the measurement device (11) is made from circuit-board material.

27 Claims, 5 Drawing Sheets

(56) References Cited

U.S. PATENT DOCUMENTS

| | | | |
|---|---|---|---|
| 4,604,633 A | 8/1986 | Kimura et al. | |
| 4,973,993 A | 11/1990 | Allen | |
| 5,365,783 A * | 11/1994 | Zweifel | 73/304 C |
| 5,388,501 A * | 2/1995 | Hazan et al. | 99/285 |
| 5,635,962 A * | 6/1997 | Goldis | 347/7 |
| 5,682,184 A * | 10/1997 | Stephany et al. | 347/7 |
| 6,016,697 A * | 1/2000 | McCulloch et al. | 73/304 C |
| 6,158,850 A * | 12/2000 | Cook | 347/85 |
| 6,295,869 B1 * | 10/2001 | Delatte | 73/304 C |
| 6,419,807 B1 * | 7/2002 | Davies et al. | 204/406 |
| 6,474,156 B1 | 11/2002 | Endo et al. | |
| 6,874,872 B2 * | 4/2005 | Lewis et al. | 347/85 |
| 6,910,377 B1 * | 6/2005 | Richter et al. | 73/290 R |
| 2002/0047881 A1 * | 4/2002 | Lewis et al. | 347/85 |
| 2002/0187074 A1 * | 12/2002 | O'Connor et al. | 422/82.05 |
| 2003/0128256 A1 | 7/2003 | Oda et al. | |
| 2004/0013545 A1 * | 1/2004 | Brown et al. | 417/413.3 |
| 2004/0118203 A1 * | 6/2004 | Heger | 73/304 C |
| 2005/0078155 A1 * | 4/2005 | Campion et al. | 347/85 |
| 2005/0112544 A1 * | 5/2005 | Xu et al. | 435/4 |
| 2005/0121080 A1 * | 6/2005 | Forster et al. | 137/487.5 |
| 2005/0128231 A1 * | 6/2005 | Talon et al. | 347/7 |
| 2005/0151810 A1 * | 7/2005 | Graham et al. | 347/86 |
| 2005/0247558 A1 * | 11/2005 | Anex et al. | 204/275.1 |
| 2006/0011474 A1 * | 1/2006 | Schulein et al. | 204/403.01 |
| 2006/0012659 A1 | 1/2006 | Slomianny et al. | |
| 2006/0086387 A1 * | 4/2006 | Gupta et al. | 137/101.25 |
| 2007/0097160 A1 * | 5/2007 | Lyman et al. | 347/5 |
| 2007/0200902 A1 * | 8/2007 | Eve | 347/84 |
| 2008/0055378 A1 * | 3/2008 | Drury et al. | 347/92 |
| 2008/0317608 A1 * | 12/2008 | Gray | 417/300 |

FOREIGN PATENT DOCUMENTS

| | | |
|---|---|---|
| EP | 1 053 875 A1 | 11/2000 |
| EP | 1 382 449 A1 | 1/2004 |
| EP | 1 462 263 A2 | 9/2004 |
| FR | 2 765 330 A1 | 12/1998 |
| FR | 2 827 215 A1 | 1/2003 |
| JP | H9166474 A | 6/1997 |
| JP | 2001328279 A | 11/2001 |
| JP | 2002507507 A | 3/2002 |
| JP | 2004050541 A | 2/2004 |
| JP | 2004535952 A | 12/2004 |

OTHER PUBLICATIONS

PCT International Search Report and Written Opinion, Dated Nov. 16 2007.

Roediger, "German Application No. 10 2006 003 054.0-26 Office Action", Apr. 3, 2009, Publisher: Deutsches Patent- und Markenamt, Published in: DE.

Emmanuel Adam, "European Patent Application No. 07 711 332.2 Office Action", Feb. 6, 2009, Publisher: EPO, Published in: EP.

* cited by examiner

METHOD, LIQUID SUPPLY UNIT, AND MEASUREMENT DEVICE FOR A LEVEL INDICATOR

The present invention relates, in general, to the field of printing machines and concerns, in particular, a method, a liquid supply unit, and a measurement device for an inkjet printer for displaying a liquid level.

Inkjet printers are characterized by selective deposition of liquid, in particular, an ink jet, onto a print material, wherein the inkjet printer is a matrix printer, in which, through targeted shooting or steering of small ink droplets, an image is generated on a surface by the ink droplets. For the application of the liquid for printed text or a printed image, a liquid supply unit is needed. In principle, the liquid supply unit is made from a liquid printing system, to which a liquid is fed from a storage container of a printing device by means of a liquid device, wherein the printing device can also be equipped with a reservoir for the liquid. The printing device of a liquid supply unit requires, for trouble-free functioning, adequate filling of the reservoir with liquid. For determining and maintaining these prerequisites, the quantity of liquid in the liquid supply unit is monitored by measuring a liquid level with sequential control. Sequence devices are understood to be all devices with which measurement values or measurement signals can be processed directly or indirectly. These can be, e.g., microprocessors.

From the state of the art, various measurement devices or methods are known for determining liquid states in a liquid supply unit. For measuring liquid states, sensors are used, wherein the sensor detects the measurement parameters and the electronics of the measurement device process the values. Known sensors with a rod-shaped design for the continuous measurement of liquid levels used in small containers for aggressive media are sufficiently well known. These have the disadvantage that they are large in volume and require additional external evaluation electronics. Additional disadvantages are produced due to the relatively large distance between the sensor element and the external evaluation electronics. For spanning the distance, lines are necessary that disadvantageously increase the structural volume and the susceptibility to interference due to variable transfer resistance values and due to electromagnetic radiation.

EP 0 778 141 B1 describes a device for detecting the empty ink state for inkjet printers. With the device, the ink level in the ink supply is monitored in order to detect when the ink supply is almost empty.

The measurement method for determining the ink supply or the ink reserve in the ink reservoir concerns an optical detector, which monitors an activation element that is connected to a complicated mechanism. One disadvantage is that the liquid level is not measured directly, but instead through an empty ink level signal, which is determined based on a predetermined time during which the chamber of a pump has not expanded.

In EP 0 784 784 B1, a measurement device with a liquid level detector for inkjet printers is disclosed, which is made from a plurality of electrically conductive rods of various lengths that measure the liquid level in a separate chamber of a container in order to come in contact with liquid ink in the container. The rods are connected to an impedance network, which creates a series of output signals representing the ink level within the shielded chamber. The disadvantage of this measurement method consists in the structural size of the sensor and in that the measurement between the sensor and the medium is not contact-less and a continuous fill level cannot be determined.

From EP 0 968 831 B1, which is considered as the closest state of the art, a contact-less level detector is known, which is located in a recyclable storage container. This level detector operates as a level indicator and is of capacitive or Hall-effect type, wherein the contact-less measurement is performed through the wall of the recyclable storage container. The measurement is performed to avoid overflow of the storage container and consequently to detect the volume of the ink in the storage container. One disadvantage of this ink circuit is the large-volume structural size of the double-sided support block, by means of which use in the printing machines in question, in particular, commercially available inkjet printers, is not possible. The level detector is now used for monitoring, in order to avoid the operating interruption of overflow of the storage container.

Therefore the invention is based on the task of creating a method, a liquid supply unit, and a measurement device of the type named above, which avoids the above disadvantages of the known arrangements and allows the production of a measurement device that is especially economical for mass-production articles with simple functional geometry and small structural size.

This task is achieved by a method, a liquid supply unit, and also a measurement device.

To produce a liquid supply unit, which is equipped with these features of the present invention and which is a component of a printing machine, with an integrated measurement device with minimized structural size, it is proposed according to the invention that the measurement device advantageously be made from a sensor with integrated evaluation electronics, wherein the liquid level in the supply unit is measured by a measurement device, which detects the presence of a liquid already at the output of the printing device. Due to the direct proximity of the measurement device to the printing device, the structural size of the liquid supply unit can be reduced. The liquid is detected by a capacitive measurement method, wherein, due to the capacitive method, the fill level is detected and converted into a condition or information that can be further processed. The condition or information concerns the change of the electrical field in the surroundings of the active measurement zone of the sensor. According to this change, the sensor generates a signal that is fed to the evaluation electronics.

The sensor is essentially made from an RC oscillator as a transducer, a demodulator, and an output stage. The change in the liquid level in the chamber of the measurement device, that is, in the active measurement zone of the capacitive sensor, causes a change in capacitance of the capacitor, by means of which the RC oscillator changes its oscillation frequency. This has the effect that the trigger stage connected after the oscillator is toggled and the switching amplifier changes its output state. Due to the direct proximity of the evaluation electronics to the sensor, stray capacitance and interference in the connection lines between the sensor element and the evaluation electronics are eliminated. The signal or signal jump generated by the evaluation electronics is fed to a device controller, which turns on or off a fluid device arranged between the storage container and the printing device. The fluid device manages the liquid level in the liquid supply unit and thus the fill state of the liquid in the printing and measurement device. In the filling of the devices, the liquid is fed from the storage container by means of the fluid device through a supply line into the printing device. Here, the liquid flows into the integrated reservoir of the printing device and slowly fills this reservoir. If the reservoir of the printing device is filled with liquid, then the liquid level in the outlet pointing upward rises up into the chamber of the measurement device, wherein this chamber is arranged on the outlet and is mounted on the printing device.

The sensor of the measurement device detects the presence of liquid in the outlet and ensures that the printing device is filled completely with liquid. The measurement device according to the invention is thus suitable as a level sensor for determining the liquid level in a liquid supply unit, wherein the liquid can be made from a water-based or solvent-based fluid with or without pigment particles, which can be present, in turn, as solutions or pigments.

Thus, the measurement device can also be used for the continuous level measurement for aggressive media in other fields of technology.

One embodiment of the invention is shown purely schematically in the drawings and is described below in more detail.

Shown are.

Figure 1:
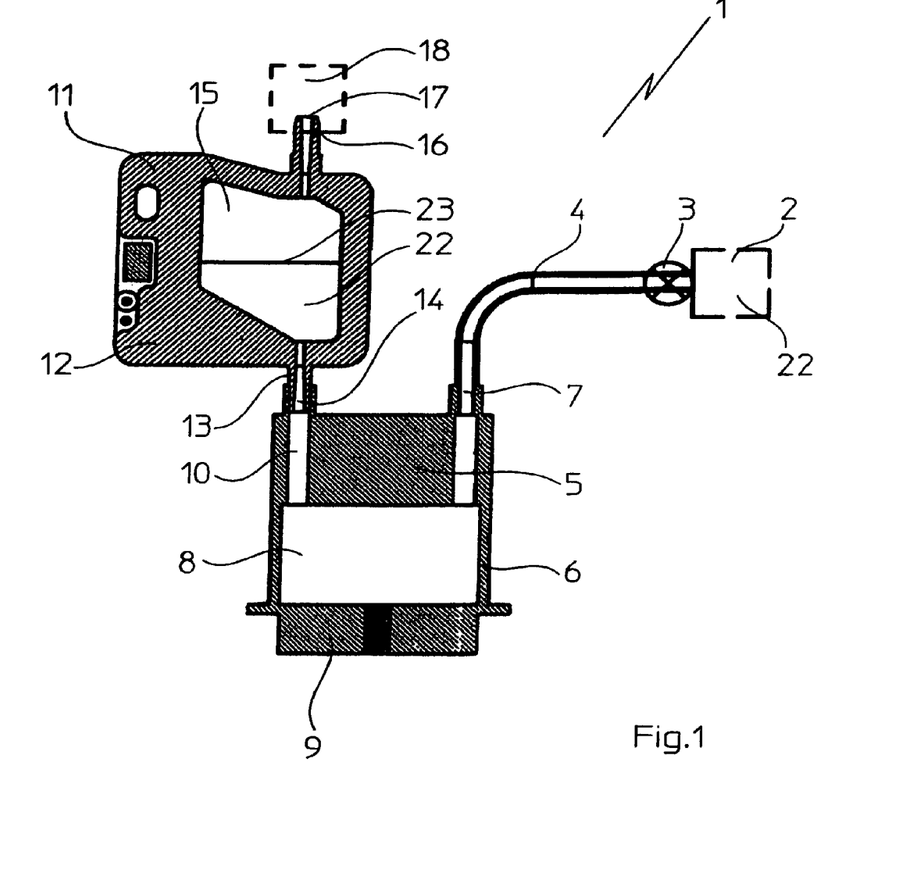
FIG. 1 in principle, a liquid supply unit in section view.

FIG. 1 shows, in section, a liquid supply unit 1 of a not-shown inkjet printer for applying liquid 22 onto a print material. The liquid supply unit 1 comprises a storage container 2, which is connected to a printing device 5 by means of a liquid device 3 and optionally by means of a liquid line 4. The printing device 5 has a housing 6 with a supply opening 7 and an outlet opening 10 and comprises a reservoir 8 with a print head 9 arranged underneath. At the outlet opening 10, a measurement device 11 is connected to a supply flange 13, which leads to a chamber 15 arranged within the measurement device 1 via an inlet opening 14. On its housing on the side opposite the supply flange 13, the chamber 15 has an overflow flange 16 with an overflow opening 17. A valve 18 is connected here. It is used especially for protection from contaminants for a liquid or ink in the chamber 15.

The measurement device 1 is constructed by an advantageously multiple-part sensor 12, which is configured according to the present construction as a capacitive sensor 12 and which is made at least partially from circuit-board material. However, the use of all other known electrical sensors 12, e.g., inductive or optoelectric sensors, is also possible.

The measurement device 1 is used for determining the liquid level in the reservoir 8 and also for its selective control. For control purposes, the measurement device 1 is connected to the fluid device 3 constructed advantageously as a pump.

Figure 2:
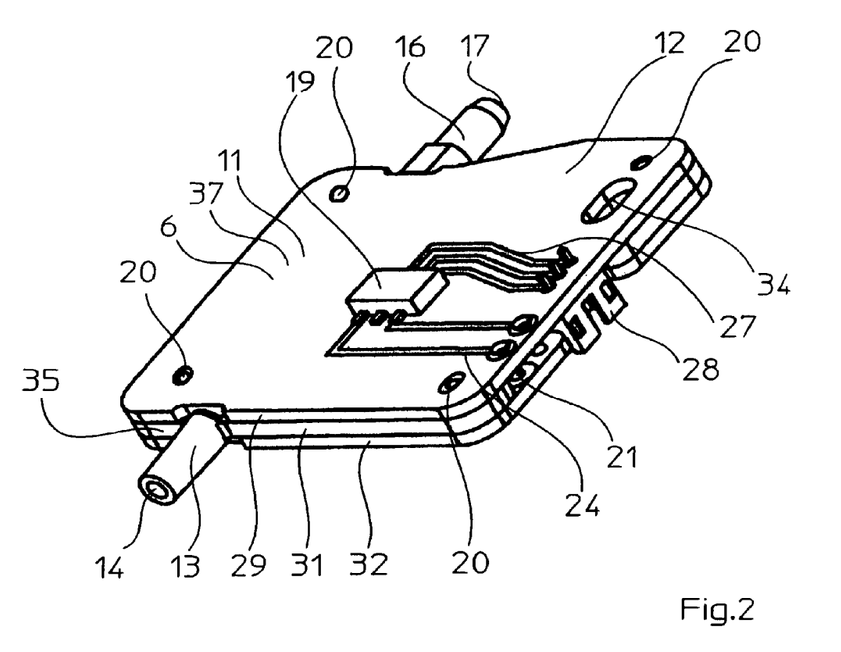
FIG. 2 a measurement device according to the invention in perspective view.

As to be taken from FIG. 2, evaluation electronics 19 are mounted on the outside of the sensor 12. These electronics are connected for the supply of power to a connector plug 28 via track conductors 27 and for signal processing to contact elements 21 via track conductors 24. A device controller (not shown) of the inkjet printer (not shown) can be connected to the contact elements 21 via a not-shown signal line.

The task of the measurement device 11 arranged in the liquid supply unit 1 consists in detecting the presence of liquid or ensuring that a reservoir 8 formed in the printing device 5 is always filled with liquid 22. To accomplish this task, the sensor 12 is arranged on the outlet opening 10 of the printing device 5 and detects, as the measurement parameter, different liquid levels 23 in the chamber 15 formed in the sensor 12 outside the printing device 5. The sensor 12 first generates measurement signals, which are transmitted to the evaluation electronics 19.

These electronics process the measurement signals and compare their values with at least two threshold values stored in them. The threshold values correspond to a minimum and a maximum fill level in the chamber 15.

If, e.g., the liquid level 23 in the chamber 15 drops, which results in a change in capacitance, below the minimum fill level, then the evaluation electronics 19 generate an on signal for turning on the liquid device 3. The activation can be realized, on one hand, by means of a direct connection between the liquid device 3 and the evaluation electronics 19. On the other hand, the on signal can be transmitted to a device controller (not shown), which is connected to the evaluation electronics 19 and which then turns on the liquid device 3. For turning on and also turning off the liquid device 3, control lines are provided between the device controller and the liquid device or between the evaluation electronics 19 and the liquid device. However, on and off signals could also be transmitted by radio.

After receipt of the on signal, the liquid device 3 pumps liquid 22 from the storage container 2 via the liquid line 4 and the printing device 5 into the chamber 15 until the maximum fill level is exceeded. The evaluation electronics 19 identify when the maximum fill level has been exceeded by comparing the supplied electrical measurement signals with the threshold value for the maximum fill level, wherein, in the present case, the electrical measurement signals correspond to sensed changes in capacitance.

When the evaluation electronics 19 identify that the maximum fill level has been exceeded, these electronics transmit an off signal to the liquid device 3 and this device turns off. Alternatively, this can take place analogous to the case described above by means of a device controller connected to the evaluation electronics 19.

After turning off the liquid device 3, the liquid level 23 drops until the minimum liquid level is reached and the liquid device 3 is turned on by a device controller or the evaluation electronics are turned on according to the method described above.

In FIG. 2, in a perspective view, an advantageous construction of the measurement device 11 according to the invention is shown with the sensor 12 in the miniaturized form of a multiple-part housing 6 with connection or positioning elements 20. The sensor 12 can be connected by means of a supply flange 13 with the inlet opening 14 to an outlet opening 10 of the printing device 5. An overflow flange 16 with an overflow opening 17 is located on the narrow housing edge opposite the narrow housing edge of the supply flange 13, set on the same center line. A valve 18 is mounted on this overflow flange. Also to be taken from FIG. 2 is that the sensor 12 has available at least one track conductor 24 and at least one contact element 21, which is connected to this conductor and which creates the electrical connection to planar electrodes 30, 33 (see FIGS. 4 and 5) in the chamber 15 and also to the associated connector plug 28 via electrical track conductors 27. This takes over the supply of power to the evaluation electronics 19. Alternatively, the power supply can also be realized, e.g., by means of batteries in the immediate proximity of the evaluation electronics 19. The evaluation electronics 19 are advantageously arranged as a printed circuit on the outer surface 37 of the housing 6 of the sensor 12. The housing 6 is thus formed at least partially by a conductive material. However, it is also conceivable to use a microprocessor, e.g., soldered onto the conductive material, as the evaluation electronics 19.

The housing 6 of the sensor 12 is constructed in several parts according to the invention and, in the broad sense, with a rectangular shape, wherein the sensor 12 is advantageously formed from three planar elements 29, 31, 32. Two of the elements 29,32 form the two outer, large surface-area housing halves, while the element 31 is arranged as the middle layer between the two elements 29,32 and, with the two elements 29,32, forms the peripheral, narrow housing edge 35. The two outer planar elements 29,32 (see FIGS. 4 and 5) are constructed as carriers for the electrodes 30,33 (see FIGS. 4 and 5). The electrodes 30,33 have a planar shape and are arranged in a recess on the inner surface 36 of the elements 29,32 (see FIGS. 4 and 5). However, all other known attachment possibilities for metal surfaces are also conceivable for attaching the electrodes 30,33. For example, the electrodes 30,33 can be sputtered onto the conductive material. Furthermore, two electrodes 31,32 for the function of sensing changes in fill level are not absolutely necessary, as in the prior construction of the invention. In principle, one electrode 30,33 is sufficient.

Figure 5:
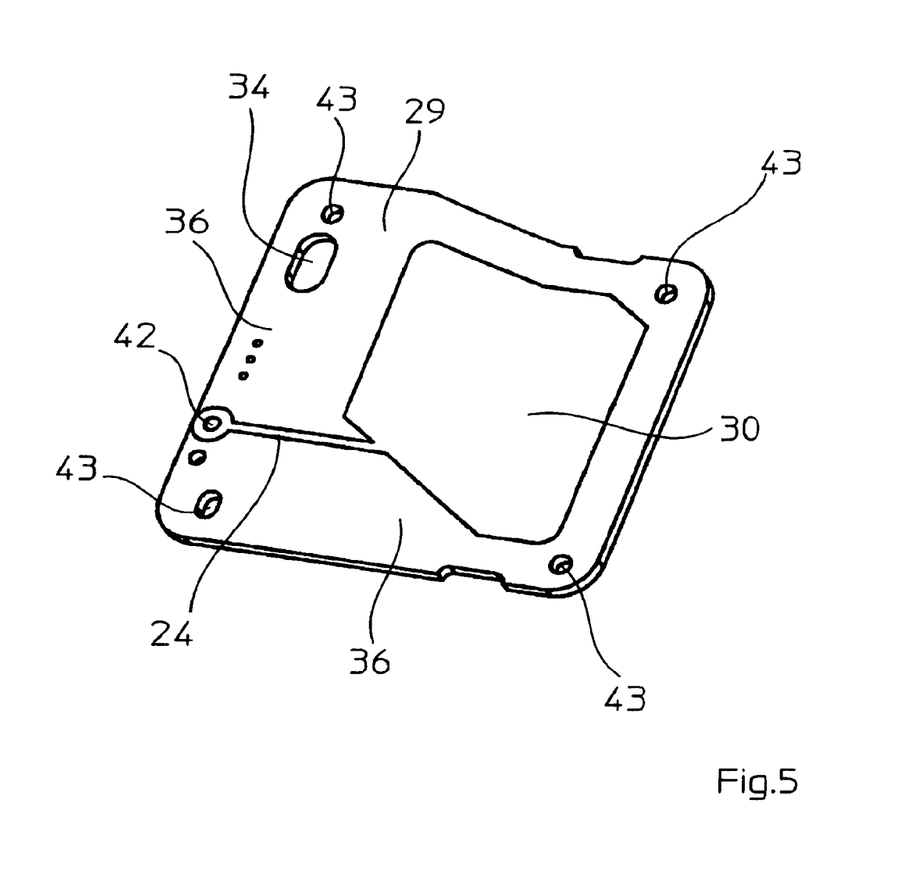

The planar element 29 is also a carrier for the evaluation electronics 19, wherein the evaluation electronics 19 are attached to the outer surface 37 of the element 29 facing away from the planar electrode 30.

Figure 3:
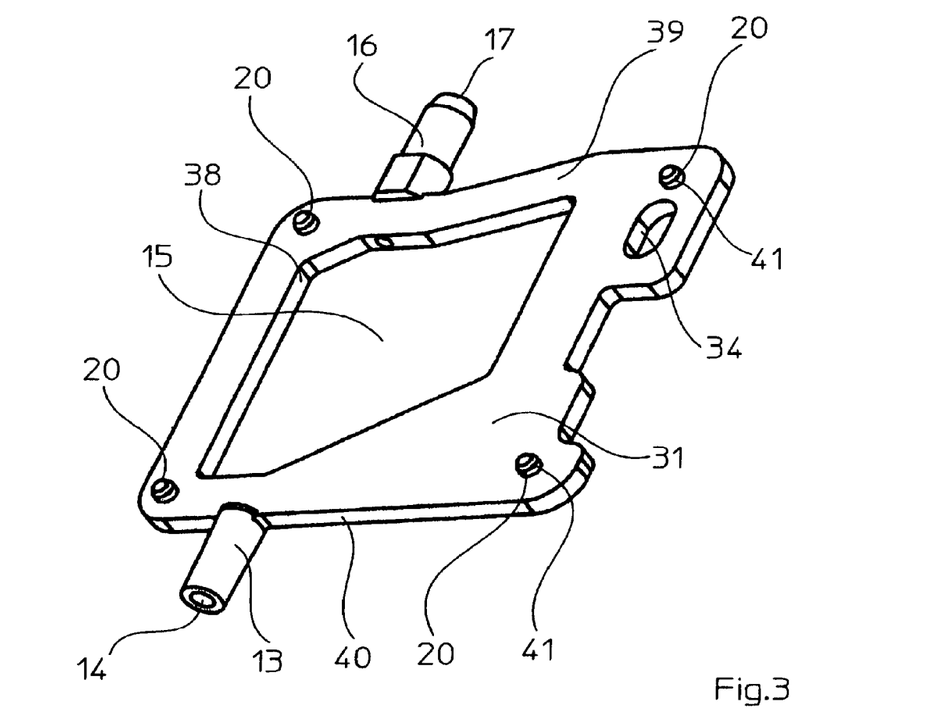
FIG. 3 in a perspective diagram, the middle planar element of the sensor with a chamber for the liquid, FIG. 4 in a perspective view, the inside of the outer planar element, which is not the carrier for the evaluation electronics, and FIG. 5 in a perspective diagram, the inside of the outer planar element, which is the carrier for the evaluation electronics.

In addition, the housing 6 of the measurement device 11 is provided with an opening 34, advantageously with an elongated hole. The elongated hole 34 is used for holding an attachment element (not shown), by means of which the liquid supply unit 1 can be mounted in a printing device or an inkjet printer. Between the two outer elements 29,32 is the element 31, which assumes the middle layer of the sensor, in a sandwich construction. The middle planar element 31 is shown in FIG. 3 in a perspective view. The planar element 31 is produced in one part and is made from plastic using injection molding technology. The planar element 31 is provided with an opening forming the chamber 15. This opening is used for holding liquid in the sensor 12, wherein the side walls of the chamber 15 are formed, on one hand, by the inner contour 38 and, on the other hand, by the elements 29,32. Here, the chamber 15 is a measurement space, which is formed within the sensor 12 and in which side walls are formed by the two planar electrodes 30,33. Due to the size of the chamber 15 in the element 31, a frame-like contour 39 is produced, on whose outer contour 40 the opposing flanges 13,16 are arranged with the openings 14,17 for accessing the chamber 15, wherein the flange 13 is used for connecting to the printing device 5 and the flange 16 is used for connecting the valve 18. In addition, pins 41 are arranged on the planar element 31 as connecting or positioning elements 20, wherein other connecting elements 20 are also conceivable. The pins 41 are located on both sides of the frame 39 and are used for attaching the planar elements 29,31,32. For mounting the elements 29,31,32, the pins 41 ensure the fixed connection of the elements 29,31,32 to each other, wherein the mounting is realized by joining the elements 29,31,32. The elements 29,31,32 can also be joined using adhesion as the connection technique, wherein the combination of joining the elements 29,31,32 through adhesion and pressure is also possible. In addition, the elements 29,31,32 can optionally be fused also without mechanical attachment elements. Here, however, there should be at least one positioning aid.

Figure 4:
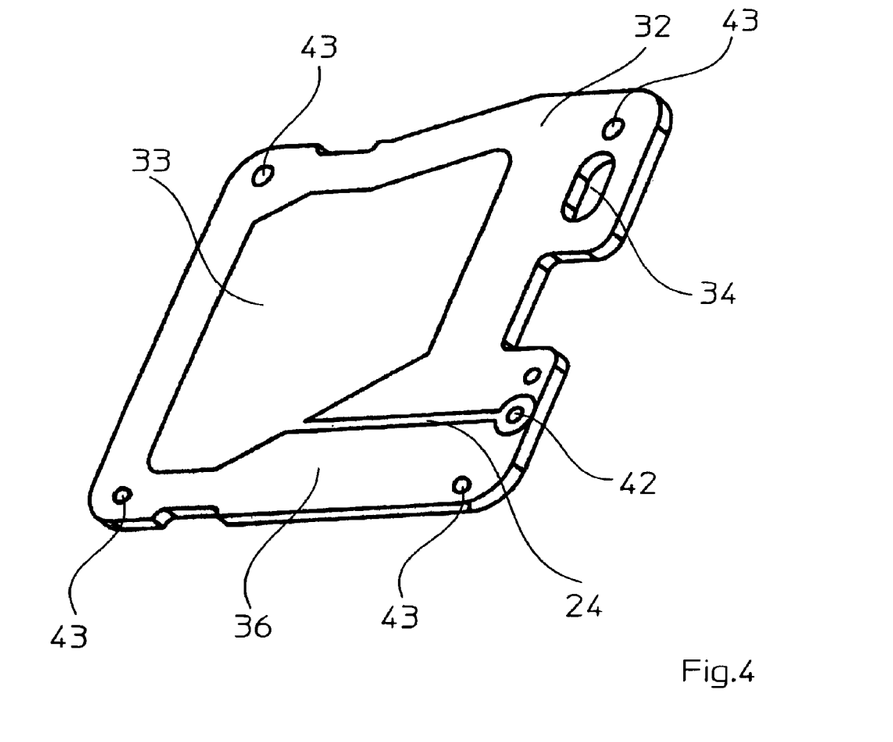

FIG. 4 shows, in a perspective view, the planar element 32, which forms an outer element of the housing 6 of the sensor 12. The planar element 32 comprises an inner surface 36, on which is arranged the electrode 33 with the track conductor 24 and a borehole 42 used for holding the contact element 21. The borehole 42 can be produced selectively with or without a via contact. If the borehole 42 does not have a via contact, contact with the track conductor 24 on the element 29 and on the element 32 is realized with a contact rivet or a contact socket (not shown). The contact element 21 creates the electrical connection to the evaluation electronics 19 on the outside 37 of the planar element 29. According to the invention, the planar element 32 is made from circuit-board material, by means of which the sensor 12 can be produced economically using circuit-board technology with one-sided or two-sided lamination. The planar element 32 is made advantageously from circuit-board material with one-sided lamination for the planar electrode 33 with associated track conductor 24 on the inner surface 36.

The planar element 32 contains, like the element 31 of the intermediate layer, an opening that is constructed as an elongated hole 34. In addition, there are relatively small openings, advantageously boreholes 43, which are used for holding the connecting or positioning elements 20 of the planar element 31.

From the perspective view of FIG. 5, the planar element 29 also represents an outer element 29 of the housing 6 of the sensor 12. Here, the inner surface 36 of the element 29 is also shown with the planar electrode 30 shown on this surface with associated track conductor 24 and the borehole 42, which optionally has a via contact or not for holding a contact element 21 and which creates the electrical connection to the evaluation electronics 19. The planar element 29 is also essentially made from circuit-board material and is laminated on two sides. The planar element 29 is thus the carrier of the electrode 30 on the inner surface 36 and the carrier of the evaluation electronics 19 on the outer surface 37.

The planar element 29 contains, like the element 31 of the intermediate layer, an opening that is constructed as an elongated hole 34. In addition, there are relatively small openings, advantageously boreholes 43, which are used for holding the connecting or positioning elements 20 of the planar element 31 for joining the housing parts.

LIST OF REFERENCE SYMBOLS

1 Liquid supply unit
2 Storage container
3 Liquid device
4 Liquid line
5 Printing device
6 Housing
7 Supply opening
8 Reservoir
9 Print head
10 Outlet opening
11 Measurement device
12 Sensor
13 Supply flange
14 Inlet opening
15 Chamber
16 Overflow flange
17 Overflow opening
18 Valve
19 Evaluation electronics
20 Connection element
21 Contact element
22 Liquid
23 Liquid level
24 Track conductors
25 Free
26 Free
27 Track conductors
28 Connection plug 29 Planar element
30 Electrode
31 Planar element
32 Planar element
33 Electrode
34 Opening
35 Housing edge
36 Inner surface
37 Outer surface
38 Inner contour
39 Frame
40 Outer contour
41 Pin
42 Borehole
43 Boreholes

The invention claimed is:

1. A method for a printing machine with a printing device to apply liquid onto a print material, the method comprising:
   supplying liquid with a liquid device via a supply opening into a lower reservoir of a housing comprising a print head, wherein the lower reservoir comprises an outlet opening that is connected with a measurement device;
   detecting a liquid level in an upper chamber of the measurement device with a sensor;
   converting the detected liquid level into a measurement signal value;
   comparing the measurement signal value to a threshold by evaluation electronics; and
   activating the liquid device when the evaluation electronics determine that the measurement signal value is below the threshold based on the comparison;
   wherein rises up into the chamber of the upper measurement device via the outlet opening of the reservoir when the reservoir is filled with liquid supplied by the liquid device; and
   wherein when the lower reservoir is completely filled, liquid from the lower reservoir rises into the upper chamber of the measurement device via the outlet opening of the lower reservoir when the lower reservoir is filled with liquid supplied by the liquid device; and
   wherein, when the liquid level in the upper chamber drops below a minimum fill level, the liquid device is turned on until a maximum fill level in the chamber is equaled or exceeded so that the lower reservoir is always completely filled with liquid.

2. The method according to claim 1, characterized in that the detection of the liquid level in the upper chamber is performed by a capacitive sensor.

3. The method according to claim 2, characterized in that the capacitive sensor detects the liquid level, and converts the detected level into the measurement signal value.

4. The method according to claim 3, characterized in that the evaluation electronics are integrated on the sensor.

5. The method according to claim 4, characterized in that a signal generated by the evaluation electronics is fed to a device controller.

6. The method according to claim 5, characterized in that the device controller turns on or off the liquid device.

7. A liquid supply unit for a printing machine with a printing device for applying liquid onto a print material with monitoring of the quantity of liquid in the liquid supply unit by measuring the liquid level with a sequential controller, the liquid supply unit comprising:
   a storage container containing the liquid;
   a housing comprising a supply opening and an outlet opening and a lower reservoir and a print head,
   wherein the lower reservoir is connected via an outlet opening to a measurement device comprising an upper chamber,
   wherein the lower reservoir is connected via the supply opening with the storage container,
   wherein the measurement device comprises a sensor to measure the liquid level in the upper chamber;
   wherein a liquid device is activated when the measurement device compares the liquid level in the upper chamber to a threshold and determines that the liquid level measured in the upper chamber is below the threshold;
   wherein liquid is supplied from the storage container to the reservoir of the printing device via a liquid line after activating the liquid device;
   wherein liquid in the filled lower reservoir rises up into the upper chamber of the measurement device via the outlet opening of the lower reservoir when the reservoir is supplied with liquid by the liquid device; and
   wherein, when the liquid level in the upper chamber drops below a minimum fill level, the liquid device is turned on until a maximum fill level in the chamber is equaled or exceeded so that the lower reservoir is always completely filled with liquid.

8. The liquid supply unit according to claim 7, characterized in that the measurement device comprises a sensor and evaluation electronics that are connected to the sensor.

9. The liquid supply unit according to claim 8, characterized in that the sensor of the measurement device detects different liquid levels in the upper chamber.

10. The liquid supply unit according to claim 8, characterized in that the sensor comprises several planar elements that contact each other in a sandwiched arrangement, wherein a middle element forms the chamber by means of a removed area, and at least one part of the measurement device is made from circuit-board material.

11. The liquid supply unit according to claim 10, characterized in that the sensor has a supply flange with an inlet opening, wherein the chamber is connected to the inlet opening.

12. The liquid supply unit according to claim 11, characterized in that the sensor contains an overflow flange connected to the upper chamber with an overflow opening, and wherein the overflow opening is connected to a valve.

13. The liquid supply unit according to claim 10, characterized in that parts of the sensor are made from a conductive material, and wherein an electrode and/or the evaluation electronics are mounted on the circuit-board material.

14. The liquid supply unit according to claim 13, characterized in that the evaluation electronics are connected to a connector plug for supplying power via at least one track conductor.

15. The liquid supply unit according to claim 13, characterized in that the evaluation electronics are connected to at least one track conductor for signal processing.

16. The liquid supply unit according to claim 15, characterized in that the track conductor is guided to a contact element that is suitable for a device controller of a device.

17. The liquid supply unit according to claim 13, characterized in that the electrode and the evaluation electronics are connected to each other by means of contact elements and by means of track conductors on the circuit-board material.

18. The liquid supply unit according to claim 10, characterized in that the planar elements are constructed of circuit-board material with track conductors embedded in plastic.

19. The liquid supply unit according to claim 18, characterized in that at least one planar element is constructed as a carrier for an electrode.

20. The liquid supply unit according to claim 19, characterized in that the electrode is arranged in at least one planar element.

21. The liquid supply unit according to claim 20, characterized in that the electrode forms at least one part of an inner wall of the upper chamber.

22. The liquid supply unit according to claim 21, characterized in that the electrode has a planar construction.

23. The liquid supply unit according to claim 10, characterized in that the sensor is formed from three planar elements.

24. The liquid supply unit according to claim 23, characterized in that a first outer element of the three planar elements is laminated on two sides, and a second outer element of the three planar elements is laminated on one side.

25. The liquid supply unit according to claim 10, characterized in that the middle element is equipped with connecting and/or positioning elements for the outer elements.

26. The liquid supply unit according to claim 7, characterized in that a sensor is arranged on the outlet opening of the housing of the printing device.

27. The liquid supply unit according to claim 7, characterized in that the sensor is constructed and arranged as part of the upper chamber.

* * * * *